May 20, 1958 — H. G. BRUYNING — 2,835,811
PULSE GENERATOR
Filed June 11, 1953

INVENTOR
HUGO GEORG BRUYNING
BY
AGENT

United States Patent Office

2,835,811
Patented May 20, 1958

2,835,811

PULSE GENERATOR

Hugo Georg Bruyning, Eindhoven, Netherlands, assignor, by mesne assignments, to North American Philips Company, Inc., New York, N. Y., a corporation of Delaware Application June 11, 1953, Serial No. 360,876

Claims priority, application Netherlands July 3, 1952

4 Claims. (Cl. 250—36)

The present invention relates to magnetron excitation devices. More particularly, the invention relates to a device comprising a magnetron to be excited by pulses and a pulse generator having an artificial cable, connected to the magnetron via a pulse transformer, this device being used, for example, in radar systems, pulse systems for communication purposes and the like. Such devices are used for the transmission of carrier-wave pulses of high peak power, for example, of a few tens or hundreds of kilowatts and of short duration, for example, of less than 1 microsecond.

In order to obtain the exciting pulses for the magnetron, the artificial cable may, for example, be charged first to a high direct voltage, after which it is discharged through the magnetron with the aid of a switch constituted by an electron tube, a gas-filled tube or a spark gap. In such a pulse generator the magnetron is usually not connected directly to the artificial cable, but via a pulse transformer, in order to obtain a stepping up of the output voltage and an adaptation to the load.

It has been found in practice that in order to obtain an effective operation of the device of the aforementioned type, the steepness of the front flank of the excitation pulses for the magnetron must not exceed a limit value determined by the magnetron tube employed. For the magnetron type 4J50, for example, the maximum permissible flank steepness is 110 kilovolts per microsecond.

This condition must be specially observed in the design of such devices for pulses of high power and short duration, for example, of 0.10 to 0.25 microsecond, as used in modern radar systems in order to obtain an effective distance indication.

An object of the invention is the provision of a device of the kind described above, which is particularly suitable for pulses of short duration and high power in which the said condition is fulfilled by particularly simple means.

In the device according to the invention the pulses produced by the pulse generator are supplied to the magnetron through the parallel combination of a resistor and a coil, provided with a ferromagnetic core, which is saturated by each of the excitation pulses.

It should be noted that the parallel combination of the resistor and the coil with its ferromagnetic core may be connected either to the primary side or to the secondary side of the pulse transformer.

In order that the invention may be readily carried into effect, it will now be described with reference to the accompanying drawing, wherein.

Figure 1:
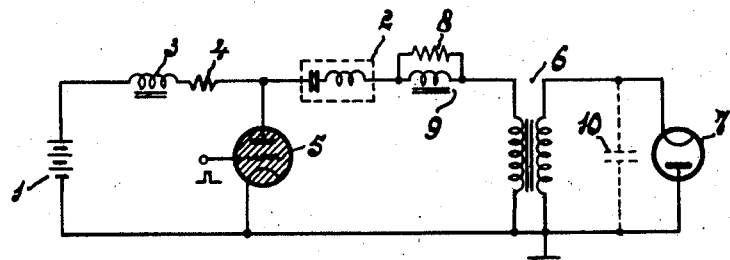
Fig. 1 is a schematic diagram of an embodiment of the device of the present invention.

Fig. 1 shows a device according to the invention, comprising a direct current source 1, which is connected to an artificial cable 2 through a choke 3 and a resistor 4, in order to charge said cable. Between the junction of the resistor 4 and the artificial cable 2 and the grounded end of the direct current source 1 is connected a normally cut-off, grid-controlled gas discharge tube 5, which is released by the control-pulses supplied to its grid. To the artificial cable 2 is connected the primary winding of a pulse transformer 6, the secondary winding of which has connected with it in parallel a magnetron 7, constituting the load. At the occurrence of each control-pulse of positive polarity at the control-grid of the gas discharge tube 5 the artificial cable discharges and then furnishes an excitation pulse for the magnetron, which thus supplies a carrier-wave pulse of, for example, about 0.10 microsecond and of high power. The secondary winding of the transformer 6 may, as usual, be bifilar with a view to the filament current supply to the magnetron cathode.

In order to prevent the steepness of the front flank of the excitation pulses for the magnetron 7 from exceeding a definite limit value, there is provided between the artificial cable 2 and the primary winding of the pulse transformer 6 the parallel combination of a resistor 8 and a coil 9, having a ferromagnetic core, which is saturated by each of the excitation pulses.

Figure 2:
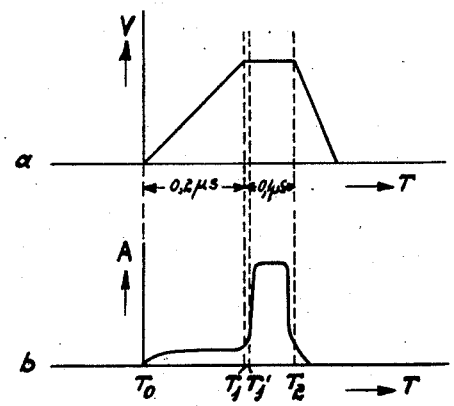
Fig. 2 is a graphic representation of time diagrams illustrating above line $a$ the course of the voltage occurring at the secondary side of the pulse transformer and illustrating above line $b$ the corresponding current, respectively.

The device described above will now be explained more fully with reference to the time diagrams of Fig. 2, wherein the curve above line $a$ shows the voltage at the secondary terminals of the pulse transformer 6 and the curve above line $b$ shows the associated current.

It is assumed that at the time $T_0$ the tube 5, operating as a switch, is released by means of a positive pulse at the grid, so that the artificial cable 2, charged to a high direct voltage, can discharge through the series combination of the network 8, 9, the pulse transformer 6 and the tube 5. At the release of the tube 5, the inductance of the coil 9, connected in series with the artificial cable 2, has a considerable value, since the ferromagnetic core has not yet been saturated and the impedance of the network 8, 9 is determined primarily by the value of the resistor 8. The load on the pulse generator 1, 6, 8, 9 is now constituted primarily by the magnetron capacity 10 (shown in broken lines in Fig. 1), which is connected in parallel with the magnetron 7.

In this condition the capacity 10 is charged gradually with a charging current (curve above line $a$ of Fig. 2), the value of which can be adjusted by means of the resistor 8 to a suitable low value, for example, 2 to 3 amperes. The voltage of the magnetron thus increases gradually with time, as is indicated in the curve above line $a$ of Fig. 2. Thus, by a suitable choice of the value of the resistor 8 with respect to the magnetron capacity 10, the steepness of the front flank of the pulsatory excitation voltage for the magnetron may be adjusted at will.

In the device described above, the parallel combination of the resistor 8 and the coil 9 having a ferromagnetic core is proportioned to be such that the ferromagnetic core is saturated approximately at the time $T_1$, at which the normal excitation voltage for the magnetron is reached. At this instant, indicated in the curves of Fig. 2 by $T_1'$, the inductance of the coil 9 decreases to a minimum value, so that the artificial cable 2 can discharge with high current strength, for example, of a peak value of 25 amperes, across the magnetron (cf. the curve above line $b$ of Fig. 2). The carrier-wave pulses emitted may have a duration of, for example, 0.10 microsecond. It has been found that with the proportioning of the network 8, 9 indicated above undue transient phenomena at the excitation of the magnetron are substantially avoided.

At the end of the excitation of the magnetron 7 at the instant $T_2$, the magnetron capacity 10 discharges across the secondary winding of the pulse transformer 6 and the voltage of the magnetron drops to zero. The artificial cable 2 is charged by the direct current source 1, and the cycle described is repeated at the occurrence of a next following control-pulse at the control-grid of the tube 5, operating as a switch.

It is observed that the attenuation of the flank produced by the network 8, 9 is substantially independent of the duration of the excitation pulses. Thus, instead of the artificial cable 2, use may be made of an artificial cable having a different delay time.

In the arrangement shown, the core of the coil is made of ferromagnetic material, having low high-frequency losses and a great permeability, for example, of high-permeable, substantially non-conductive ferrite. If such magnetic material is used, the ratio between the inductance of the coil 9 in the unsaturated condition of the core and that in the saturated condition may become very high or, in other words, the inductance of the coil 9 may be reduced to a minimum, if the core is saturated. This is of great importance, particularly for the transmission of short excitation pulses.

It has been found in the device shown that the saturation of the coil core occurs after a time (delay time) which is dependent upon the number of turns of the coil; i. e. the delay time increases with the number of coil turns. This means that at a long delay time, the inductance of the coil also increases under the saturated condition of the core. A long delay time with a comparatively small number of turns may be obtained by pre-magnetization of the core in a direction opposite the field of the winding. This is, before it is saturated the core material must go through a greater portion of the magnetization curve.

Figure 3:
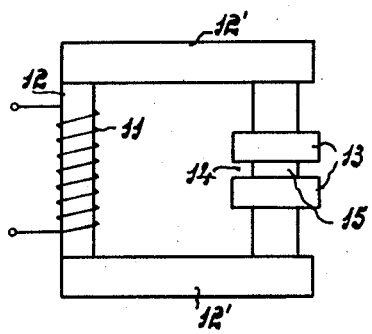
Fig. 3 is a schematic diagram of a preferred embodiment of a coil comprising a ferromagnetic core which may be used in the embodiment of the device of Fig. 1.

Fig. 3 shows the construction of a coil tested extensively in practice. The windings 11 of the coil 9 are arranged on a U-shaped core 12, 12', 12' of high-permeable, substantially non-conductive ferrite. On the free ends of said core are provided pole shoes 13, facing one another and separated from one another by an air-gap 14 and the sectional area of which exceeds that of the bent-over core 12, 12' and 12'. In the air gap between the pole shoes 13 is arranged a disc-shaped permanent magnet 15, magnetized in its direction of thickness, and made, for example, of ferroxdur, which is composed primarily of non-cubic crystals of poly-oxides of iron and at least one of the metals barium, strontium, lead and, if desired, calcium. This permanent magnetic material has a high coercivity and the magnetic circuit can be proportioned to be such that demagnetization of the permanent magnet 15 due to the flux varying each time in direction is avoided.

The principal data of the coil, constructed and thoroughly tested in practice is as follows:

Number of coil turns, 13;
Length of the limb 12, 7 centimeters;
Cross-sectional area of the limb 12, 2 square centimeters;
Cross-sectional area of the limbs 12', 4 square centimeters;
Cross-sectional areas of the pole shoes 13, 20 square centimeters;
Thickness of the air gap, 2 millimeters; and
Cross sectional area of the permanent magnet 15, 10 square centimeters.

It is to be understood that the invention is not limited to the details disclosed but includes all such variations and modifications as fall within the spirit of the invention and the scope of the appended claims.

What is claimed is:

1. A device comprising a magnetron, a pulse generator having a delay line providing excitation pulses, and means in the pulsing circuit of said magnetron comprising a resistor and an inductor connected in parallel combination, said inductor having a ferromagnetic core which is saturable by each of said excitation pulses, and a pulse transformer coupling said generator to said magnetron through said parallel combination.

2. A device comprising a magnetron, a pulse generator having a delay line providing excitation pulses, a resistor and an inductor connected in parallel combination, said inductor having a highly permeable, substantially non-conductive ferrite core which is saturable by each of said excitation pulses, said core having an air gap, a pair of pole shoes facing one another and having a sectional area which exceeds that of said ferrite core disposed in said air gap, a disc-shaped permanent magnet interposed between said shoes within said air gap, said magnet being magnetized in its direction of thickness and being made primarily of non-cubic crystals of poly-oxides of iron and at least one of the metals barium, strontium, lead and calcium, the parallel combination of said resistor and said inductor having said core being proportioned to effect saturation of the core approximately at the instant when the normal excitation voltage of said magnetron is reached, and a pulse transformer coupling said generator to said magnetron through said parallel combination.

3. A device comprising a magnetron, a pulse generator having a delay line providing excitation pulses, a resistor and an inductor connected in parallel combination, said inductor having a ferromagnetic core which is saturable by each of said excitation pulses, said parallel combination having an impedance having a value at which saturation of said ferromagnetic core is effected substantially at the instant when the normal excitation voltage of said magnetron is reached, and a pulse transformer coupling said generator to said magnetron through said parallel combination.

4. A device comprising a magnetron, a pulse generator having a delay line providing excitation pulses, and means in the pulsing circuit of said magnetron comprising a resistor and an inductor connected in parallel combination, said inductor having a ferromagnetic core which is saturable by each of said excitation pulses, means to effect pre-magnetization of said core, and a pulse transformer coupling said generator to said magnetron through said parallel combination.

References Cited in the file of this patent

UNITED STATES PATENTS

| | | |
|---|---|---|
| 2,381,763 | McCreary | Aug. 7, 1945 |
| 2,419,201 | Crump | Apr. 22, 1947 |
| 2,436,395 | Manley | Feb. 24, 1948 |
| 2,469,977 | Morrison | May 10, 1949 |
| 2,636,860 | Snoek | Apr. 28, 1953 |
| 2,693,532 | Krienen | Nov. 2, 1954 |

OTHER REFERENCES

Bell System Technical Journal, vol. XXV, No. 4, October 1946, pp. 603–615.